Dec. 12, 1933.    J. ROGALEWSKI    1,939,279
BUN CUTTING MACHINE
Filed Jan. 21, 1933    3 Sheets-Sheet 1

Witness:
Geo. L. Chapel

Inventor
Joseph Rogalewski
By Rice and Rice
Attorneys

Dec. 12, 1933.  J. ROGALEWSKI  1,939,279
BUN CUTTING MACHINE
Filed Jan. 21, 1933   3 Sheets-Sheet 2
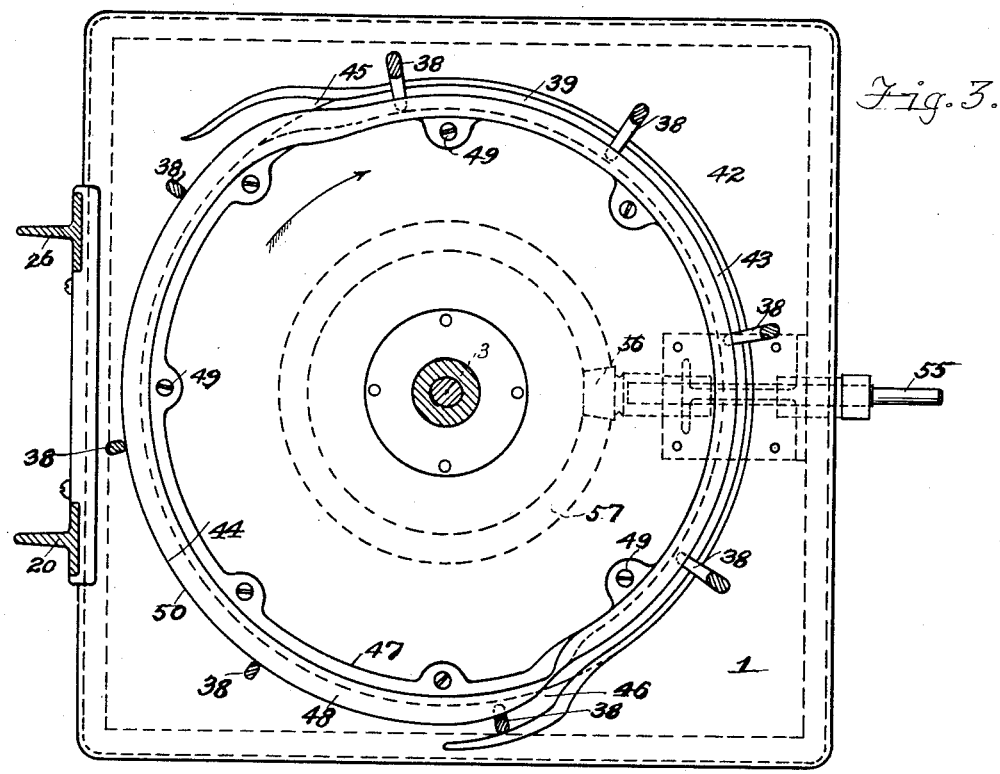
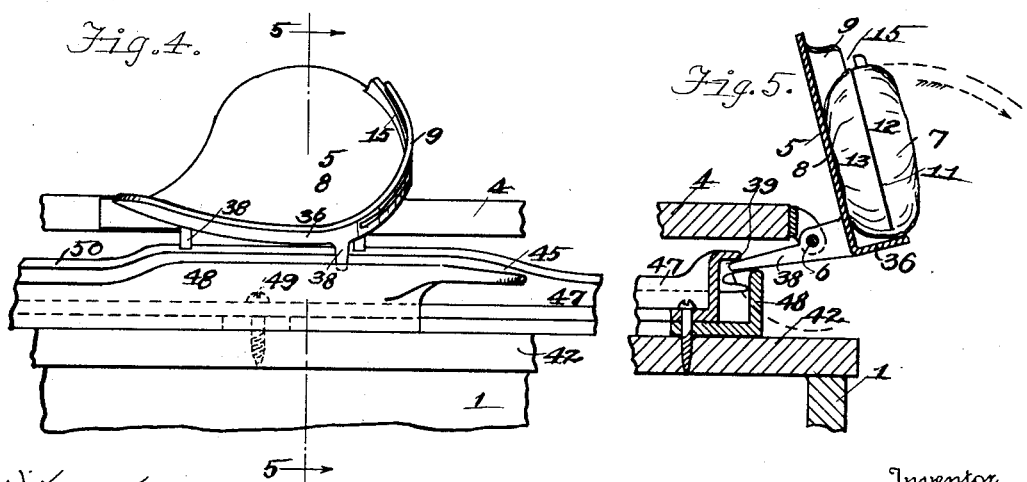
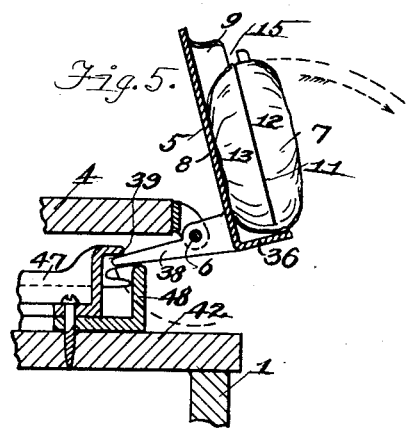
Witness:
Geo L. Chapel
Inventor
Joseph Rogalewski
By Rice and Rice
Attorneys

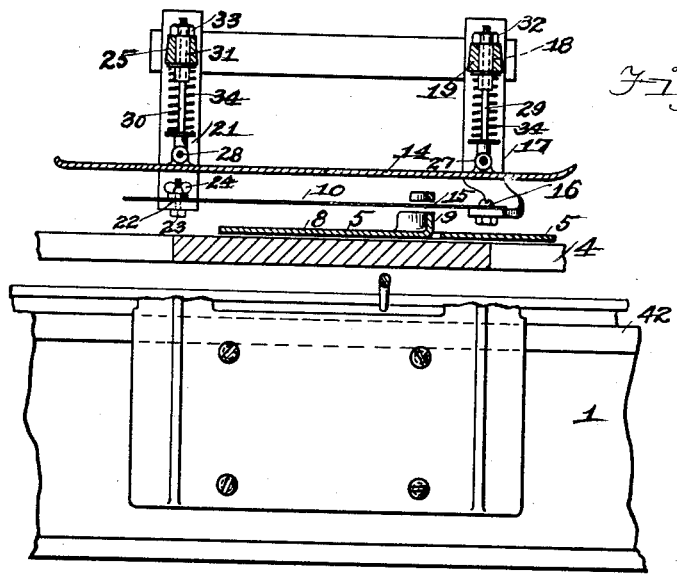
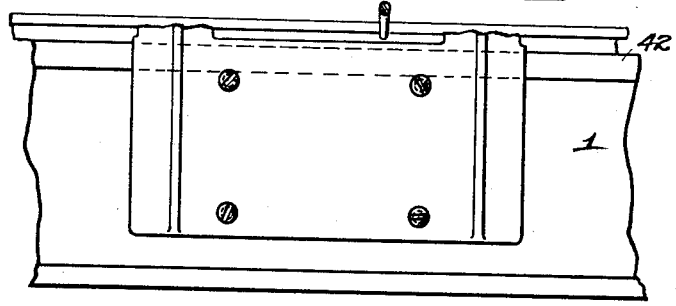
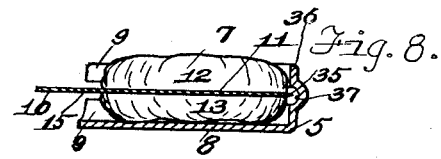
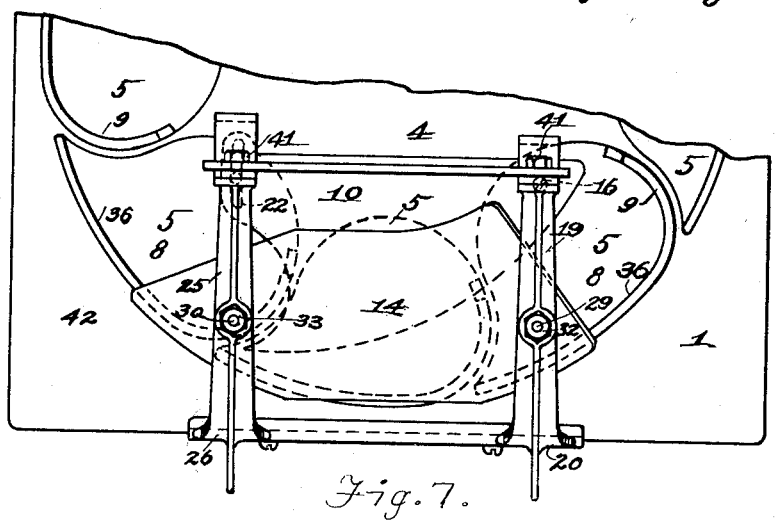

Patented Dec. 12, 1933

1,939,279

UNITED STATES PATENT OFFICE 1,939,279

BUN CUTTING MACHINE

Joseph Rogalewski, Nelson Township, Kent County, Mich.

Application January 21, 1933. Serial No. 652,825

6 Claims. (Cl. 146—72)

The present invention relates to machines for cutting farinaceous buns or the like; and its objects are to provide a machine whereby such buns may be cut into portions partially or completely severed; to provide such a machine whereby the buns may be evenly or uniformly cut; and to provide such a machine whereby the buns may be rapidly cut and without danger of injuring the operator.

These and any other objects hereinafter appearing are attained by, and the invention finds preferable embodiment in, the illustrative machine particularly described in the body of this specification and illustrated by the accompanying drawings, in which:—

Figure 3 is a top plan view of parts of the machine, partially sectioned on line 3—3 of Figure 1;

Figure 4 is an elevational rear view of parts of the machine;

Figure 5 is a vertical sectional view of said parts taken on line 5—5 of Figure 4;

Figure 6 is an elevational left-hand view of parts of the machine partially sectioned vertically on line 6—6 of Figure 1;

Figure 7 is a top plan view of said parts; and

Figure 8 is a vertical sectional view of a cutting blade and of a bun holder, showing a modified construction thereof.

Figure 1:
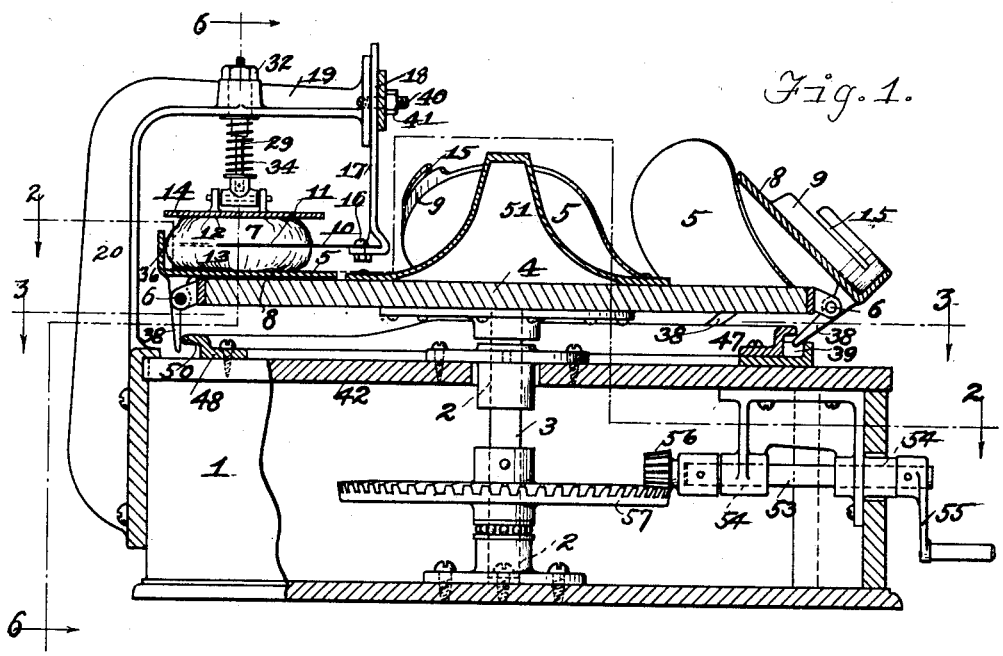
Figure 1 is an elevational front view of a machine for cutting farinaceous buns or the like, the machine being partially sectioned on a vertical plane corresponding to line 1—1 of Figure 2.

In cutting or slicing buns, biscuits and the like by a knife held in the hand, one is likely to cut the hand in which the bun is held unless he proceeds slowly and carefully; and the buns are not cut parallelly with their sides, nor into equal portions. The object of this invention is to obviate these difficulties.

The embodiment of the invention illustrated by these drawings comprises a suitable frame or base 1, preferably of box form as shown, having journal bearings 2 in which bears the vertical shaft 3 of a flat rotatable element 4. On the periphery of this element a plurality of holders 5 are mounted pivotally at 6 so as to be turned inwardly to the position seen at the left-hand side of Figure 1 or outwardly as shown otherwise in said view and particularly in Figures 4 and 5. These holders are angularly spaced about the axis of shaft 3, and in their inwardly turned position each is adapted to receive a bun 7 resting on the holder's bottom 8. As the element 4 is rotated in the direction of the curved arrows in Figures 2 and 3, the upright rear walls 9 of these holders, engaging the buns, carry the same into and through the field of the operation of a fixed blade 10 parallel with element 4 and the buns are thereby cut at 11 into upper and lower portions or halves 12, 13. To hold the bun on the bottom 8 of its holder, its upper surface engages under, and is slid along, a flat plate 14 parallel with said blade and above the same, i. e. on the opposite side thereof from the element 4. The rear walls 9 of the holders have slits 15 through which the blade passes in the rotation of element 4 and the holders carried thereby.

The blade 10 is shown pivoted at 16, adjacent one end, on the leg 17 and is supported adjacent its other end on another leg 21, and has a slot 22 through which passes a bolt 23 provided with a wing nut 24 which may be tightened to clamp the blade in the desired turned position about its pivot 16 in order to cut the bun to the desired depth. These legs 17, 21 depend from the horizontal arms 19, 25 of posts 20, 26 mounted on the base frame 1 and may be clamped by the screw bolts 40 having nuts 41, to hold the blade 10 in desired vertical position. The plate 14 is pivoted at 27, 28 on a pair of rods 29, 30 passing through openings 18, 31 in said horizontal arms. These rods are threaded and have nuts 32, 33 for adjusting the vertical position of said plate to accommodate buns of various thicknesses, and the coiled springs 34 serve to press the plate on the buns to hold the same in place in their holders.

In order to completely sever the portions 12, 13 of the bun, and to insure the cutting edge 35 of the blade from contacting the side wall 36 of the holder, said wall may be provided on its inner side with a groove 37 into which said edge enters in its completely severing operation as seen in Figure 8.

The bun holders are turned or tilted on their pivots 6 for the purpose of ejecting the buns therefrom after having been cut, or at least for the purpose of carrying the buns to a position (as seen in Figures 4 and 5) where they may be readily removed from the holders. These holders are retained in the position seen at the left hand side of Figure 1 during the cutting operation, or in the position shown in Figures 4 and 5 after the buns are cut, and are turned from either of these positions to the other by their depending fingers 38 which slidably travel in a circuitous groove or guide 39 during the rotation of the element 4.

This guide is mounted on the top 42 of the box base 1 and beneath the rotatable element 4. This guide is approximately circular and concentric with the shaft 3 and comprises arc portions, 43, 44 of relatively lesser and greater radii. These portions are connected by the inclined guide portions 45, 46. The guide is preferably formed of two metal members 47, 48 secured as by screws 49, as indicated in Figure 3. During the cutting operation the finger 38 rides along the outer edge 50 of member 47, thus holding the bottom of the holder on the flat element 4 as indicated at the left hand side of Figure 1; but when the finger passes through the inclined portion 45 of the guide the holder is turned to the position seen in Figures 4 and 5. The holder may now be refilled, and on its finger passing through the inclined guide portion 46 the holder is returned to position in which the bun therein is cut.

Figure 2:
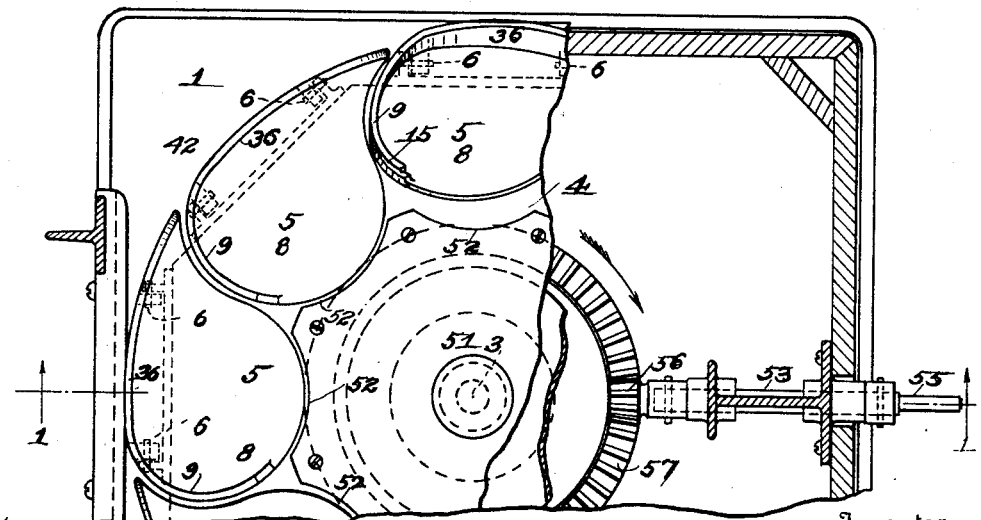
Figure 2 is a top plan view of a portion thereof, partially sectioned on horizontal planes corresponding to line 2—2 of Figure 1 and parts being broken away.

As shown in Figures 1 and 2 the rotatable element 4 may have a metallic top plate with a conical portion 51 and angularly spaced sockets 52 receiving the bottoms of the bun holders during the cutting operation and thus additionally holding said holders against horizontal displacement during said operation. The element 4 may be rotated by any suitable means, as by the shaft 53 journalled at 54, and having the crank handle 55 and gear 56 meshing with the gear 57 on the shaft 3.

The invention being intended to be pointed out in the claims, is not to be limited to or by details of construction of the particular embodiment thereof illustrated by the drawings or hereinbefore described.

I claim:

1. A bun cutting machine comprising: a flat rotatable element; a fixed blade parallel therewith for cutting the buns; bun holders angularly spaced on said element, receiving the buns and carrying the same by said element's rotation successively through the field of the blade's operation, the bun holders being pivotally mounted on said element to turn in its radial direction to outward and to inward positions and having fingers slidable in the hereinafter-mentioned guide; an arcuate guide for the fingers so inclined from the direction of said element's rotative movement as to turn the bun holders to outward position at a point in said element's rotation spaced from said field.

2. A bun cutting machine comprising: a flat rotatable element; a fixed blade parallel therewith for cutting the buns; bun holders angularly spaced on said element, receiving the buns and carrying the same by said element's rotation successively through the field of the blade's operation, the bun holders being pivotally mounted on said element to turn in its radial direction to outward and to inward positions and having fingers slidable in the hereinafter-mentioned guide; a circuitous guide for the fingers comprising portions radially spaced at different distances respectively from the axis of said element's rotative movement, the fingers when sliding in one of said portions operating to hold the bun holders in outward position and when sliding in the other one of said portions operating to hold the bun holders in inward position.

3. A bun cutting machine comprising: a flat rotatable element; a fixed blade parallel therewith for cutting the buns; bun holders angularly spaced on said element, receiving the buns and carrying the same by said element's rotation successively through the field of the blade's operation, the bun holders being pivotally mounted on said element to turn in its radial direction to outward and to inward positions and having fingers slidable in the hereinafter-mentioned guide; a circuitous guide for the fingers comprising portions radially spaced at different distances respectively from the axis of said element's rotative movement, the fingers when sliding in one of said portions operating to hold the bun holders in outward position and when sliding in the other one of said portions operating to hold the bun holders in inward position, the guide comprising also inclined portions connecting said first-mentioned portions and operating to turn the bun holders from one of their said positions to the other position respectively.

4. A bun cutting machine comprising: a flat rotatable element having angularly spaced sockets; a fixed blade parallel with said element for cutting the buns; bun holders angularly spaced on said element and pivotally mounted thereon to turn in its radial direction into and out of said sockets, the bun holders carrying the buns by said element's rotation successively through the field of the blade's operation.

5. A bun cutting machine comprising: a flat rotatable element; a fixed blade parallel therewith for cutting the buns; bun holders angularly spaced on said element, receiving the buns and carrying the same by said element's rotation successively through the field of the blade's operation, the bun holders being pivotally mounted on said element to turn in its radial direction to outward and to inward positions.

6. A bun cutting machine comprising: a flat rotatable element; a fixed blade parallel therewith for cutting the buns; bun holders angularly spaced on said element, receiving the buns and carrying the same by said element's rotation successively through the field of the blade's operation, the bun holders being pivotally mounted on said element to turn in its radial direction to outward and to inward positions; means for successively turning the bun holders on their pivotal mountings at a point in said element's rotative movement.

JOSEPH ROGALEWSKI.